United States Patent [19]

Lardellier et al.

[11] Patent Number: 5,181,675
[45] Date of Patent: Jan. 26, 1993

[54] POD FOR SUSPENDING A TURBOJET ENGINE UNIT OF THE BYPASS TYPE UNDER THE WING OF AN AIRCRAFT

[75] Inventors: Alain, M. J. Lardellier, Melun; Patrick W. R. Saillot, Vaux le Penil, both of France

[73] Assignee: Societe Nationale d'Etude et Moteurs d'Aviation S.N.E., Paris, France

[21] Appl. No.: 886,838

[22] Filed: May 22, 1992

[30] Foreign Application Priority Data

May 23, 1991 [FR] France ................... 91 06198

[51] Int. Cl.$^5$ ............................................. B64D 27/00
[52] U.S. Cl. ..................................... 244/54; 248/554; 248/555
[58] Field of Search ............... 244/54, 53 R; 248/554, 248/555, 556, 557; 60/39.31, 39.32

[56] References Cited

U.S. PATENT DOCUMENTS

| 3,201,069 | 8/1965 | Haskin | 244/54 |
| 3,517,897 | 6/1970 | Wells | 244/54 |
| 4,013,246 | 3/1977 | Nightingale | 248/554 X |
| 4,055,041 | 10/1977 | Adamson et al. | 60/226 R |
| 4,147,029 | 4/1979 | Sargisson | 60/39.31 |
| 4,458,863 | 7/1984 | Smith | 244/54 |
| 4,506,850 | 3/1985 | McConnell | 244/54 |
| 4,555,078 | 11/1995 | Groguard | 244/54 |
| 4,717,094 | 1/1988 | Chee | 244/54 |
| 4,725,019 | 2/1988 | White | 244/54 |
| 4,917,331 | 4/1990 | Hager et al. | 244/54 |

FOREIGN PATENT DOCUMENTS

| 0314568 | 5/1989 | European Pat. Off. . |
| 2262201 | 9/1975 | France . |
| 2290350 | 6/1976 | France . |
| 2295876 | 7/1976 | France . |
| 2606081 | 6/1988 | France . |
| 1236917 | 6/1971 | United Kingdom | 248/554 |

*Primary Examiner*—Joseph F. Peters, Jr.
*Assistant Examiner*—Christopher P. Ellis
*Attorney, Agent, or Firm*—Oblon, Spivak, McClelland, Maier & Neustadt

[57] ABSTRACT

A pod for suspending a turbojet engine unit below the wing of an aircraft includes a suspension assembly with two laterally spaced front beams connecting the turbojet fan casing to the wing, and two rear links disposed in a common vertical plane and pivotally connected at one end to the wing and at the other end to a connection link which is connected at least to the exhaust casing of the engine, the front beams being interconnected by cross-bracing and being connected at the level of the downstream edge of the cross-bracing to at least one fixed part of the engine.

6 Claims, 5 Drawing Sheets

POD FOR SUSPENDING A TURBOJET ENGINE UNIT OF THE BYPASS TYPE UNDER THE WING OF AN AIRCRAFT

FIELD OF THE INVENTION

The invention relates to a pod for suspending a turbojet engine unit, particularly of the bypass type, below the wing of an aircraft, as well as to the associated hanging means.

BACKGROUND OF THE INVENTION

It is at present known to attach a bypass turbojet engine, particularly of the front fan type, to the end of a supporting mast suspended from the wing. This arrangement may be used for engines in which the bypass ratio does not exceed 10, which corresponds to fan diameters which remain compatible with an acceptable aerodynamic drag of the pod. Examples of such a suspension arrangement are disclosed in French Patents Nos. 2 262 201; 2 295 876 and 2 290 350.

French Patent No. 2 606 081 discloses an alternative suspension arrangement in which the engine is mounted under the wing by means of a pylon mast associated with supporting arms.

Other known arrangements involve integration of the pod with the wing of the aircraft, and examples of such constructions are disclosed in U.S. Pat. Nos. 4,055,041 and 4,147,029, and published European Application No. 0 314 568.

One of the aims of the invention is to provide an underwing suspension arrangement which is suitable for engines with a very high bypass ratio, especially greater than 11, while retaining the advantages of close integration between the engine and the wing of the aircraft, particularly adequate ground clearance, and at the same time ensuring satisfactory aerodynamic flow between the pod and the wing, and consequently an acceptable drag.

In addition, with respect to conventional arrangements in which the supporting mast introduces a twisting moment at a point situated at 12 o'clock, the invention further aims to provide a suspension which permits the mass of the engine unit to be reduced by not requiring such substantial reinforcement of the structures for accommodating the stresses on the engine.

SUMMARY OF THE INVENTION

Accordingly, the invention provides a pod for suspending a turbojet engine unit, particularly of the bypass type, below the wing of an aircraft, said engine defining a longitudinal axis of rotation and including a fan casing, an intermediate casing and an exhaust casing, the pod including suspension means comprising two front beams situated at the same height and spaced from each other when viewed in a transverse plane perpendicular to said longitudinal axis of said engine, each of said beams being connected at one end to said fan casing and at the other end to said wing, cross-bracing interconnecting said two front beams in a substantially horizontal plane at the level of said fan casing, first connection means connecting said two front beams at the level of the downstream edge of said cross-bracing to at least one fixed part of said turbojet engine, two rear rods situated in the same longitudinal plane passing through said longitudinal axis of said engine, respective attachments fixed to said wing, said rear rods being pivotally connected at one end to said respective attachments, and second connection means common to both of said rear rods and connecting said rods to at least said exhaust casing, each of said rods being pivotally connected to said second connection means at the end opposite said one end of the rod.

Other features and advantages of the invention will become apparent from the following description of preferred embodiments of the invention, with reference to the attached drawings.

DESCRIPTION OF THE PREFERRED EMBODIMENTS

Figure 1:
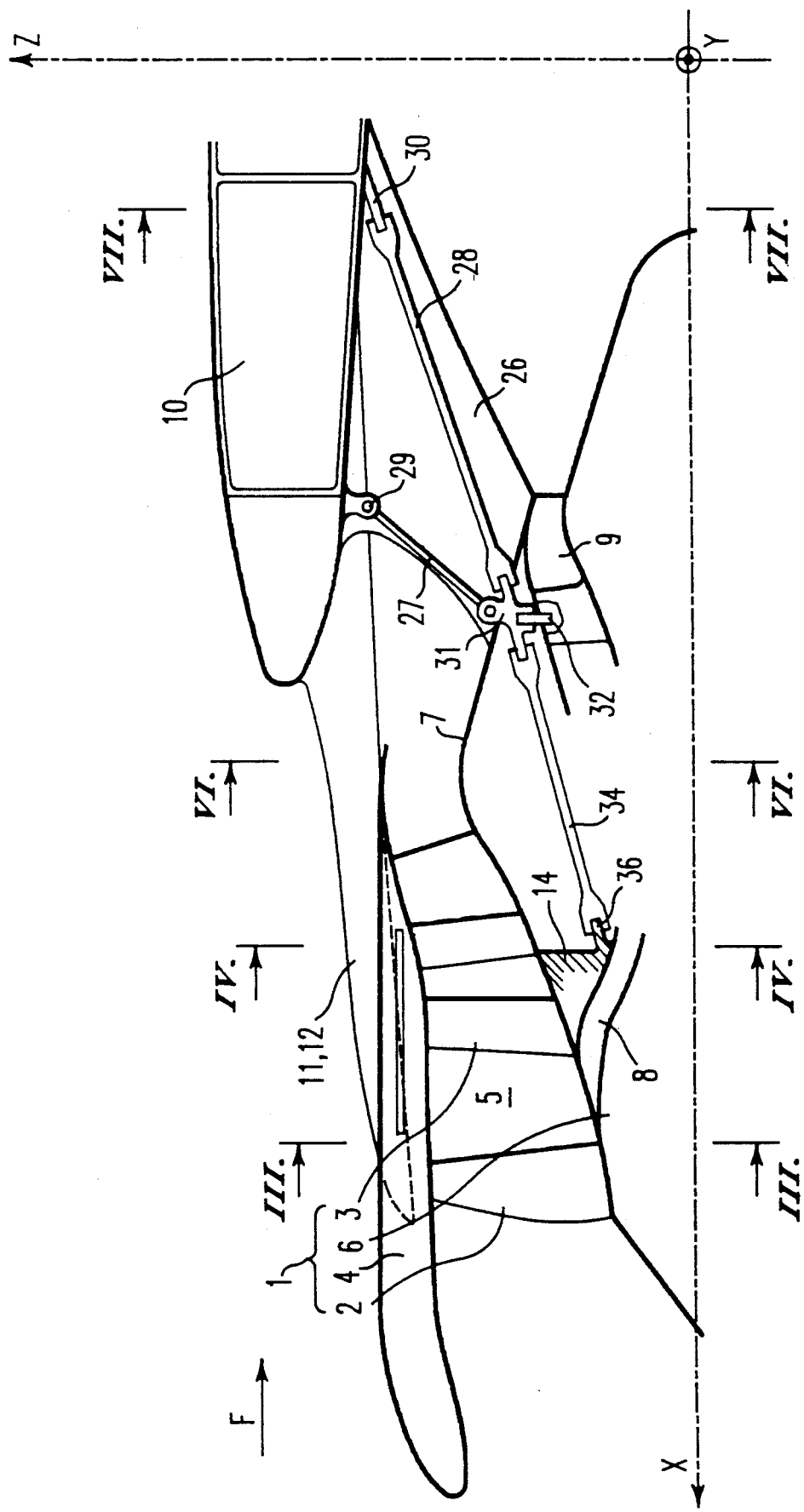
FIG. 1 is a diagrammatic longitudinal section, taken in a vertical plane passing through the axis of rotation of the engine, showing the top half of a turbojet engine unit which is mounted below the wing of an aircraft by suspension means in accordance with the invention.

A turbjet engine unit 1 of the bypass type, known per se, is diagrammatically illustrated in FIG. 1, the unit comprising a front fan consisting of a rotor 2 and at least one flow-straightener stage 3 surrounded by a fan casing 4 forming an annular duct 5 for the passage of a secondary flow, and a central gas turbine engine 6 of which the outlines of the external envelope and casings are indicated at 7, the air inlet at 8 and the gas outlet at 9. The turbojet unit 1 is attached under the wing 10 of an aircraft and upstream thereof using suspension means in accordance with the invention, a first embodiment of which is shown in FIGS. 1 to 4, together with FIGS. 6 and 7.

In accordance with the invention the suspension means comprises upstream and downstream elements, upstream and downstream being defined relative to the normal direction of flow of the gases in the turbojet engine, which elements form the pod. The upstream elements comprise two beams 11 and 12, each of which is rigidly connected at one end to the wing 10 of the aircraft, and is rigidly connected at the other end to the fan casing 4.

Figure 2:
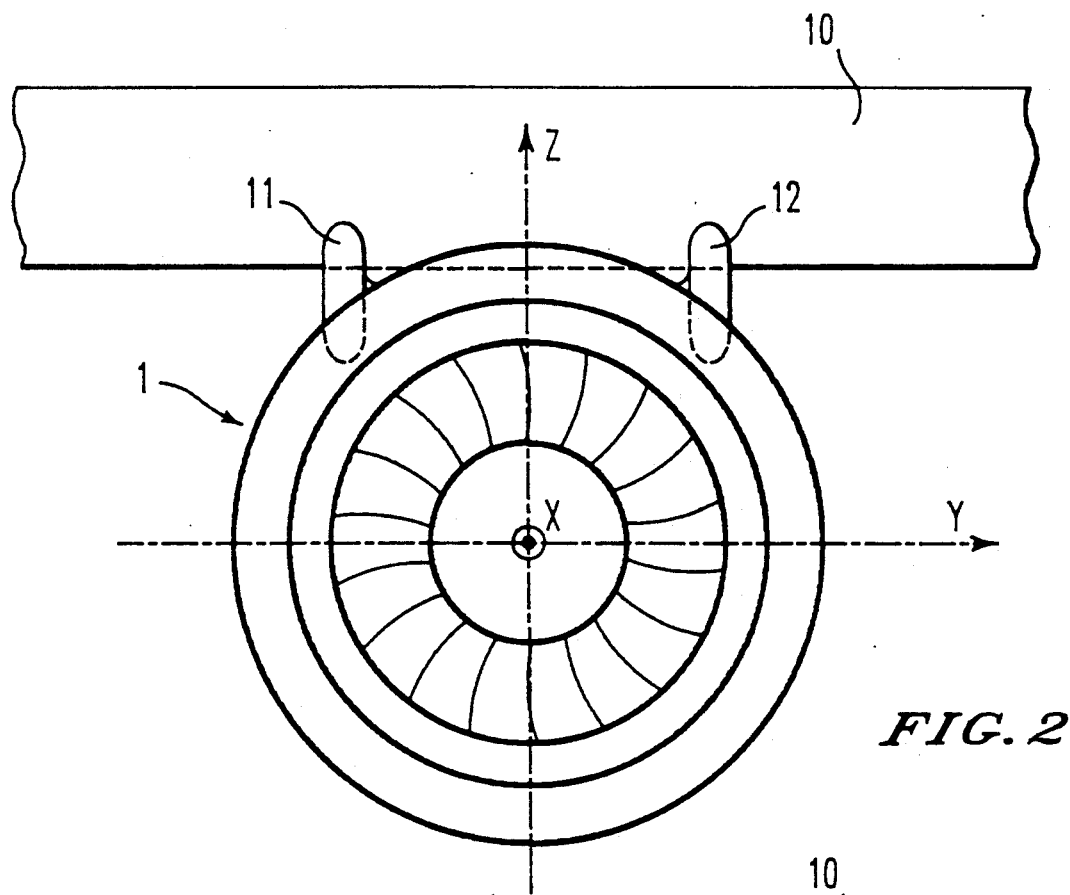
FIG. 2 is a front view of the turbojet engine unit looking in the direction of arrow F shown in FIG. 1.

As may be seen particularly in FIG. 2, the two beams 11 and 12 are situated at the same height and are spaced from each other, the particular arrangement being shown by way of example. However, depending on the streamlining requirements, the beams may or may not be parallel and/or equally spaced from each other.

Figure 3:
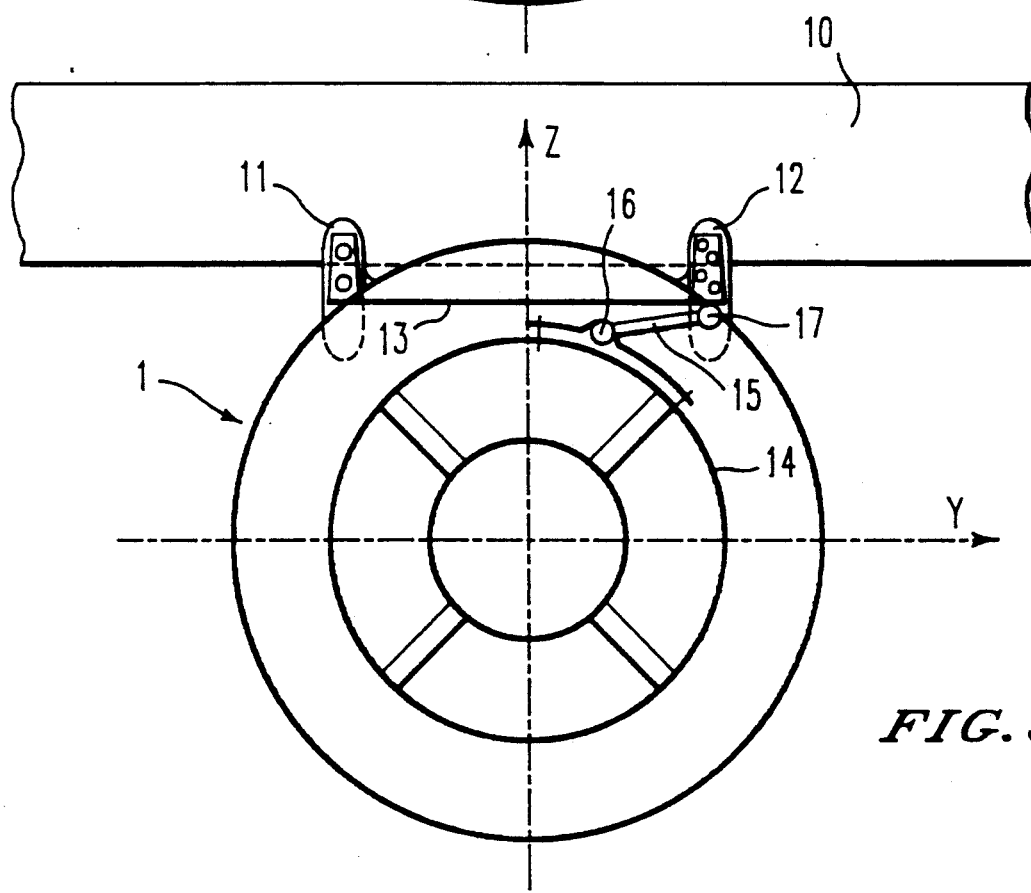
FIG. 3 is a diagrammatic transverse sectional view of the turbojet engine unit taken in the plane of line III—III in FIG. 1, and showing part of the suspension means in a first embodiment.
Figure 4:
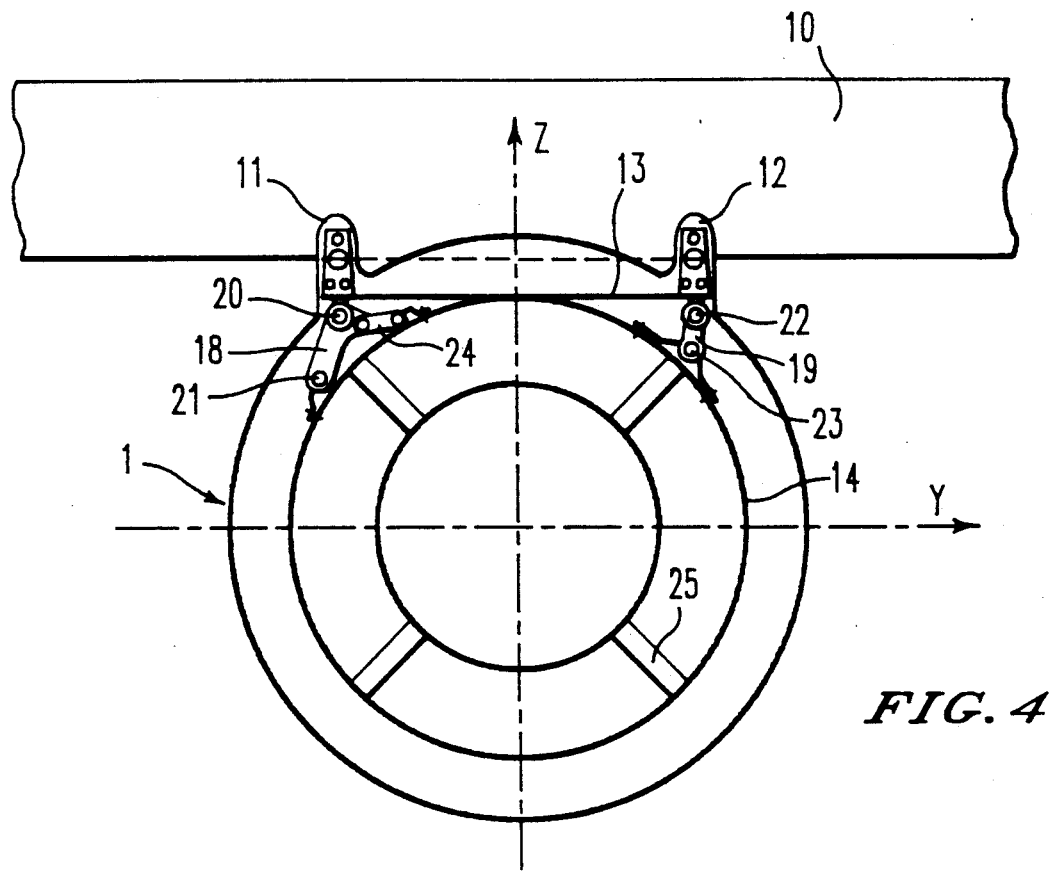
FIG. 4 is a diagrammatic transverse sectional view of the turbojet engine unit taken in the plane of line IV—IV in FIG. 1, and showing another part of the suspension means in the first embodiment.

In the first embodiment shown in FIGS. 3 and 4, the two beams 11 and 12 are interconnected by cross-bracing 13 in a horizontal plane, although this bracing need not be horizontal, nor even follow the general curved shape of the pod. At the upstream end of the cross-bracing 13, one of the beams 12 is connected to the intermediate casing 14 of the turbojet engine by a link 15 as shown in FIG. 3, the ends 16 and 17 of the link being pivotally connected to the casing 14 and the beam 12 respectively. This link 15 transmits suspension stresses along the transverse axis Y. On the downstream edge of the cross-bracing 13, two links 18 and 19 are each pivotally attached at one end 20, 22 at the level of the respective beam 11,12 as shown in FIG. 4, and the other end 21,23 of each link 18,19 is pivotally connected to the intermediate casing 14. The links 18 and 19 are substantially vertically disposed and transmit the stresses along the vertical axis Z. An additional link 24 is pivotally connected at one end to the link 18 and at its other end to the casing 14, the link 24 being disposed in a direction generally perpendicular to the link 18 and serving to transmit the stresses along the transverse axis Y. All these stresses are taken up at the level of the said intermediate casing 14 by four main radially oriented arms 25 arranged mutually perpendicular to each other and situated at 45 degrees on opposite sides of the vertical axis.

Figure 6:
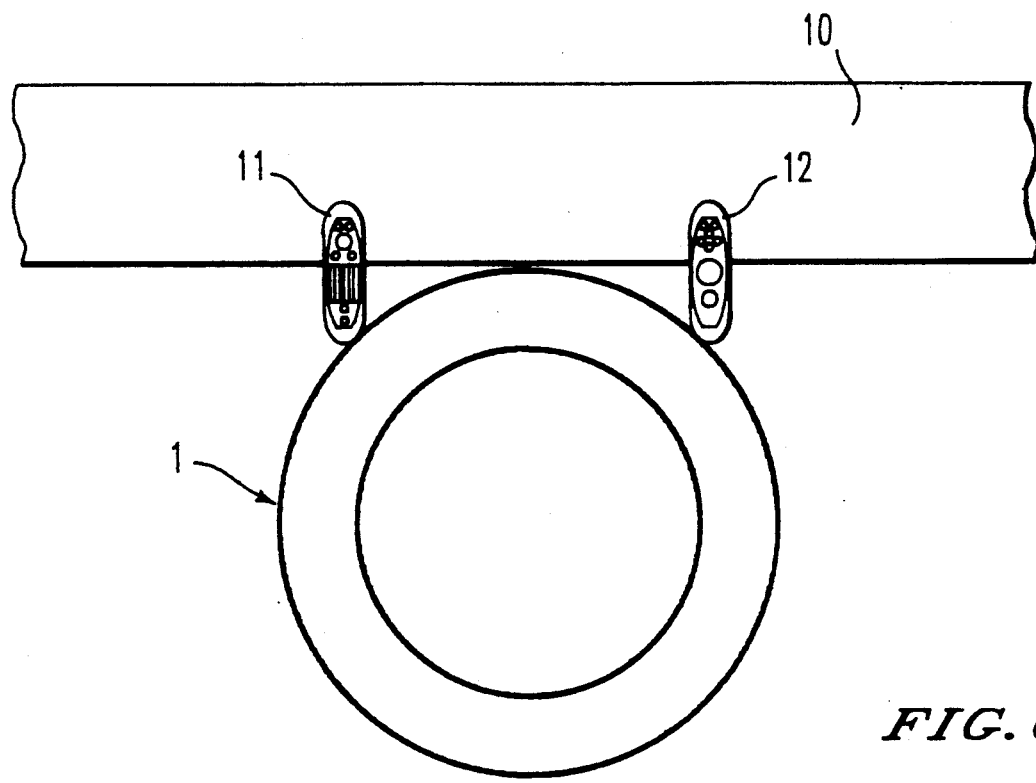
FIG. 6 is a diagrammatic transverse sectional view of the turbojet engine unit taken in the plane of line VI—VI in FIG. 1.

The downstream portions of the beams 11 and 12 are shown in FIG. 6. These are shown with an oval shape and a vertical orientation for the sake of example, but different streamline shapes and orientations may be used.

Figure 7:
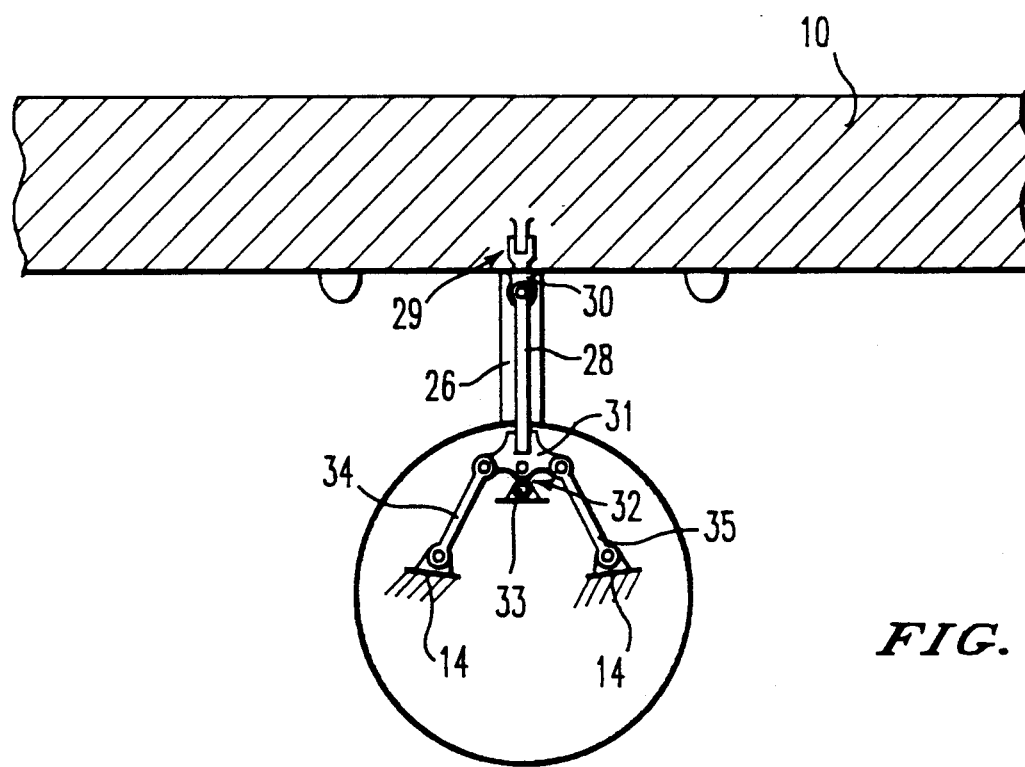
FIG. 7 is a diagrammatic transverse sectional view of the turbojet engine unit taken in a plane on line VII—VII in FIG. 1, and showing a further part of the suspension means in the first embodiment.

The downstream elements of the suspension means are contained in a thin mast 26 and comprise, as shown in FIGS. 1 and 7, two rods 27 and 28 each of which is pivotally connected at one end to a respective attachment 29,30 fixed to the wing 10 of the aircraft, and at the other end to a connecting member 31. The rods 27 and 28 are situated in the same longitudinal plane as each other passing through the rotational axis of the turbojet engine.

The connecting member 31 is connected to the exhaust casing 33 of the engine by a vertically disposed link 32, and to the intermediate casing 14 at respective pivotal connections 36 by two links 34 and 35 directed upstream and oriented at 45 degrees. Stress along the vertical axis is transmitted by the said rod 27 and stress along the longitudinal axis X of the turbojet engine unit is transmitted by the rod 28, whereas the resultant of the stresses is taken up, on the one hand, through the link 32 to the exhaust casing 33 and, on the other hand, through the links 34,35 to the intermediate casing 14.

Figure 5:
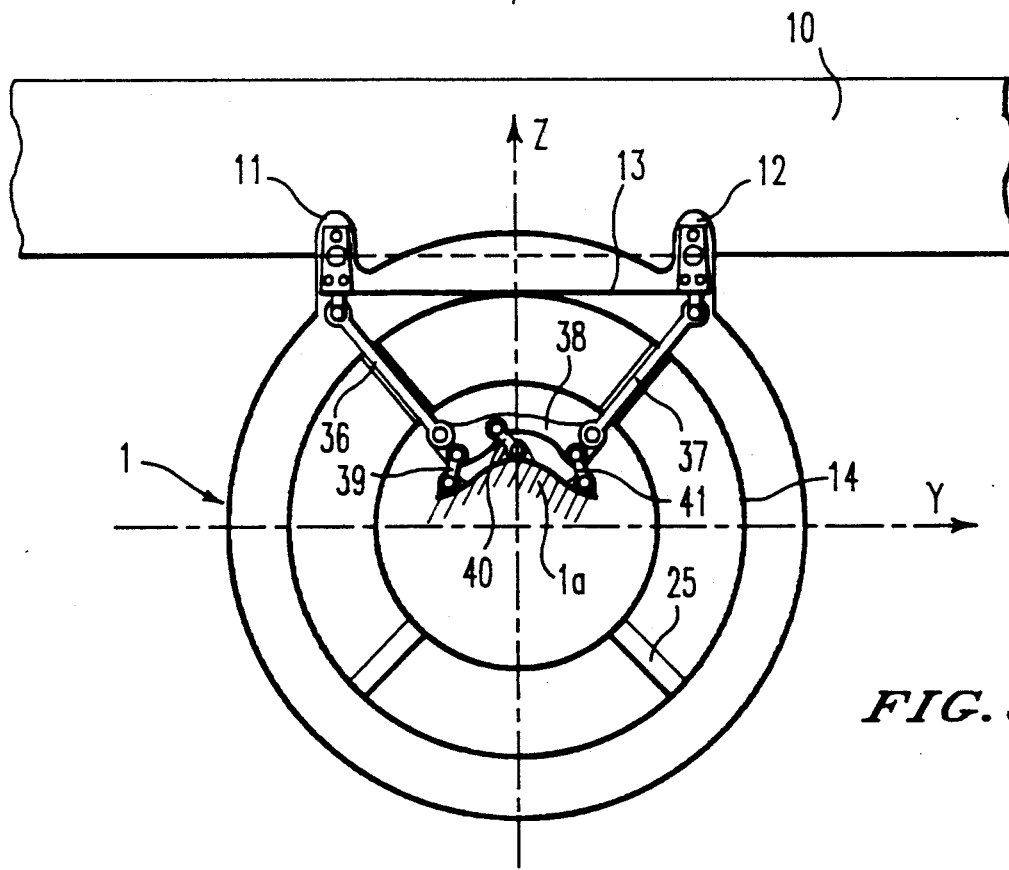
FIG. 5 is a view similar to that of FIG. 4 but showing the corresponding part of the suspension means in a different embodiment.

In the alternative embodiment shown in FIG. 5, the beams 11 and 12 are connected at the downstream edge of the cross-bracing 13 to a plate 38 by means of two links 36 and 37, the plate 38 being connected by means of three links 39,40 and 41 to a central fixed part 1a of the turbojet engine 1. Stresses oriented in the direction of the vertical axis Z are transmitted by the substantially vertically disposed lateral links 39 and 41, and stresses oriented along the transverse axis Y are transmitted by the substantially horizontally disposed central link 40, all of these stresses being taken up by the plate 38 and distributed by the links 36 and 37 towards the beams 11 and 12.

The embodiments of the under-wing suspension which have just been described with reference to FIGS. 1 to 7 are isostatic suspensions.

Figure 8:
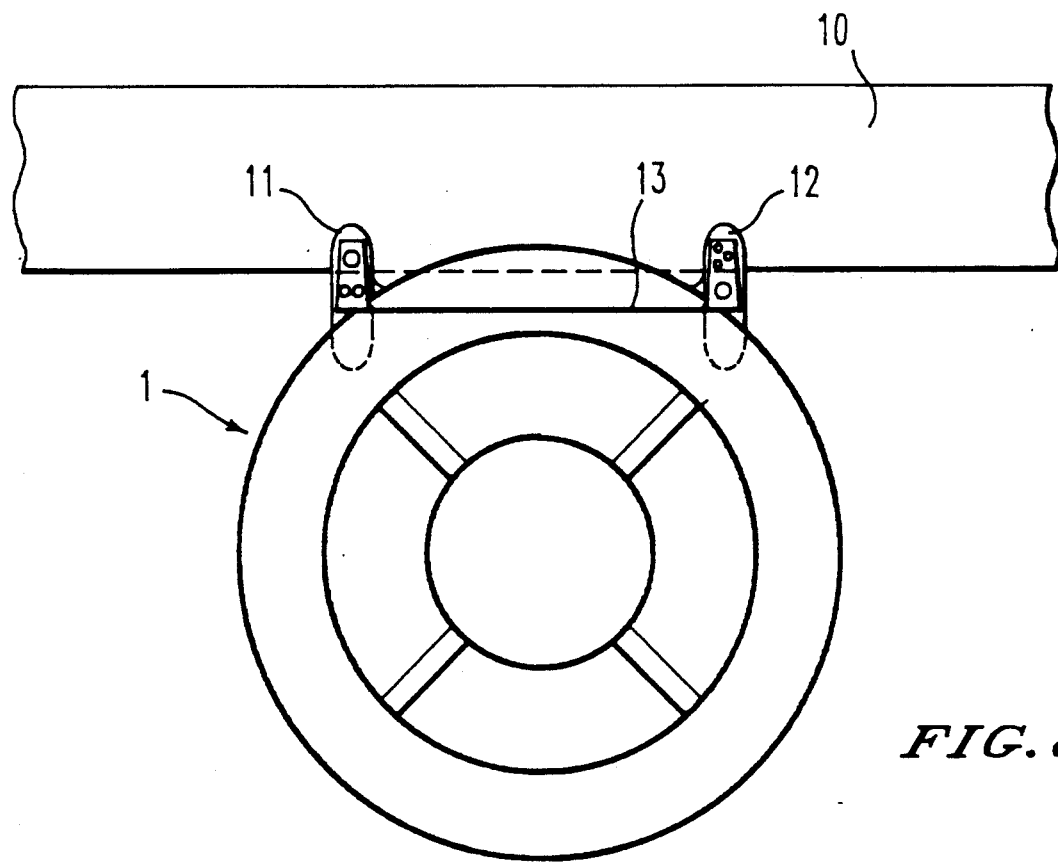
FIG. 8 is a diagrammatic view similar to that of FIG. 3, but showing the corresponding part of the suspension means in a further embodiment.
Figure 9:
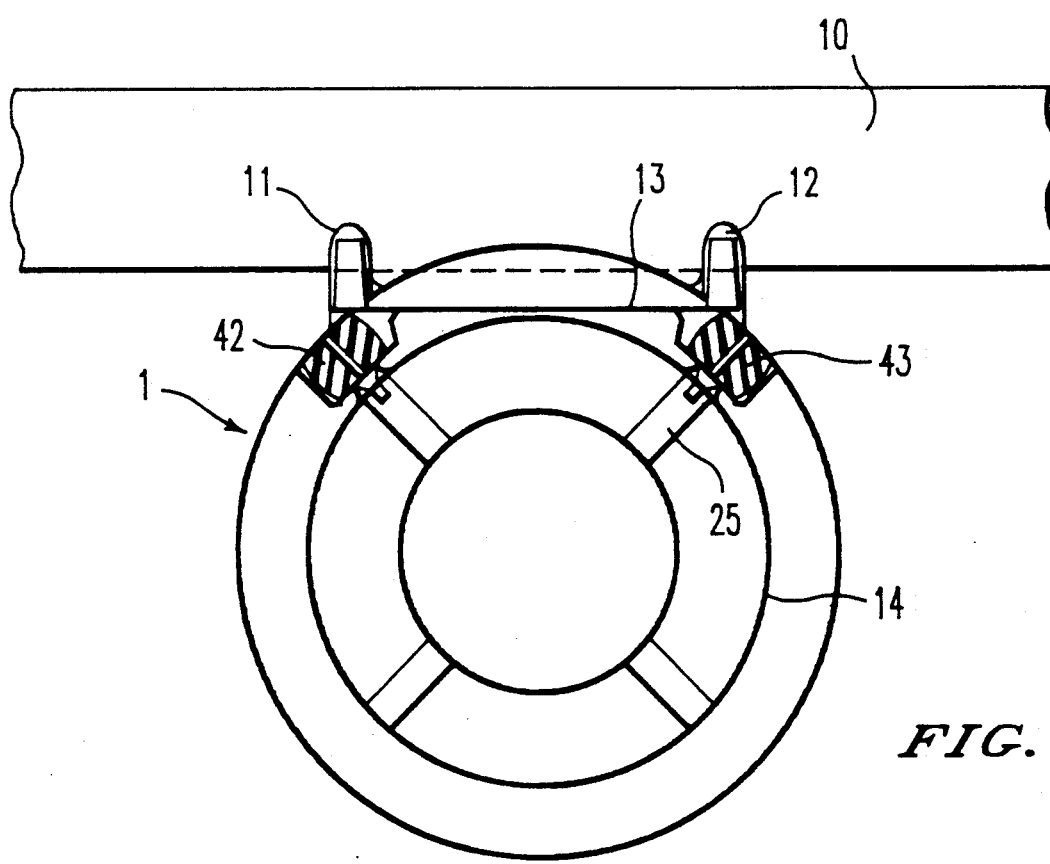
FIG. 9 is a view similar to that of FIG. 4 and showing the corresponding part of the suspension means in the further embodiment of FIG. 8.

Depending upon the particular application and the operating conditions a hyperstatic version of the suspension may be used, such as the embodiment described with reference to FIGS. 8 and 9.

The general arrangement of the suspension having upstream elements and downstream elements remains identical to that in the previous embodiments. Indeed, the downstream elements and their connections to the exhaust casing of the turbojet engine are identical in construction to those described with reference to FIGS. 1 and 7. Also, the upstream elements comprise, as before, the two beams 11 and 12 connected in a horizontal plane by cross-bracing 13, the construction corresponding to that described with reference to FIGS. 1,2 and 6.

The difference lies in the connections of the beams 11 and 12 to the turbojet engine unit. As can be seen from FIG. 8, the link 15 provided at the upstream end of the cross-bracing 13 in the isostatic embodiment shown in FIG. 3 is not used. In addition, at the level of the downstream edge of the cross-bracing, the beams 11 and 12 are connected to the corresponding main arms 25 of the intermediate casing of the engine by respective flexible and insulating suspensions 42 and 43. These suspensions 42 and 43 each support stresses both along the transverse axis Y and along the vertical axis Z.

Among the advantages afforded by the present invention, it will be noted that a reduction of engine mass is obtained as a result of the fact that the twisting moment along the longitudinal axis X is better supported by the main arms 25 of the intermediate casing due to the presence of the two lateral beams 11 and 12 and to the arrangement of the said arms 25 at an angle of 45 degrees on opposite sides of the vertical axis.

We claim:

1. A pod for suspending a turbojet engine unit below the wing of an aircraft, said engine defining a longitudinal axis of rotation and including a fan casing, an intermediate casing and an exhaust casing, the pod including suspension means comprising:

two front beams situated at the same height and spaced from each other when viewed in a transverse plane perpendicular to said longitudinal axis of said engine, each of said beams being connected at one end to said fan casing and at the other end to said wing, cross-bracing interconnecting said two front beams in a substantially horizontal plane at the level of said fan casing, first connection means connecting said two front beams at the level of the downstream edge of said cross-bracing to at least one fixed part of said turbojet engine, two rear rods situated in the same longitudinal plane passing through said longitudinal axis of said engine, respective attachments fixed to said wing, said rear rods being pivotally connected at one end to said respective attachments, and second connection means common to both of said rear rods and connecting said rods to at least said exhaust casing, each of said rods being pivotally connected to said second connection means at the end opposite said one end of the rod.

2. A pod according to claim 1, including a mast of small thickness in which said two rear rods are housed, and wherein said second connection means comprises a connection member to which said rear rods are pivotally connected, a vertically oriented link connecting said connection member to said exhaust casing, and two links directed upstream at an angle of 45 degrees connecting said connection member to the intermediate casing of said turbojet engine.

3. A pod according to claim 1, wherein said suspension means includes a link connecting one of said front beams to said intermediate casing of said turbojet engine at the level of the upstream end of said cross-bracing.

4. A pod according to claim 1, wherein said intermediate casing has four main arms disposed orthogonally and offset by 45° from the vertical, and said first connection means comprises a first substantially vertical link connecting one of said front beams to the intermediate casing, a second substantially vertical link connecting the other of said front beams to said intermediate casing, and a substantially horizontal link pivotally connected at one of its ends to said second vertical link and at its other end to said intermediate casing, said links each being pivotally connected to said intermediate casing in the region of one of said four main arms of said casing.

5. A pod according to claim 1, wherein said first connection means comprises a plate connected to a central fixed part of said turbojet engine by two laterally disposed substantially vertical links and a central near horizontal link, and two links connecting said two front beams to said plate.

6. A pod according to claim 1, wherein said intermediate casing has four main arms disposed orthogonally and offset by 45° from the vertical, and said first connection means comprises a respective flexible and insulating suspension connecting each of said front beams to a respective one of said arms so as to bear the stresses along both the transverse and vertical axes.

* * * * *

UNITED STATES PATENT AND TRADEMARK OFFICE
CERTIFICATE OF CORRECTION

PATENT NO. : 5,181,675
DATED : January 26, 1993
INVENTOR(S) : Alain M. J. Lardellier et al.

It is certified that error appears in the above-identified patent and that said Letters Patent is hereby corrected as shown below:

On the title page, Item [73],

The assignee's name is incorrect, should read as follows:

--SOCIETE NATIONALE D'ETUDE ET DE CONSTRUCTION DE MOTEURS D'AVIATION

"S.N.E.C.M.A."--

Signed and Sealed this

Seventh Day of December, 1993

*Attest:*

BRUCE LEHMAN

*Attesting Officer*  *Commissioner of Patents and Trademarks*